（12） United States Patent
Carlson

(10) Patent No.: US 10,368,500 B2
(45) Date of Patent: *Aug. 6, 2019

(54) SOD POSITIONING MACHINE

(71) Applicant: Sidekick USA, LLC, Plainfield, IL (US)

(72) Inventor: Paul Carlson, Plainfield, IL (US)

(73) Assignee: Sidekick USA, LLC, Plainfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,265

(22) Filed: Jun. 26, 2017

(65) Prior Publication Data

US 2017/0354093 A1 Dec. 14, 2017

Related U.S. Application Data

(63) Continuation of application No. 14/695,406, filed on Apr. 24, 2015, which is a continuation-in-part of application No. 13/358,143, filed on Jan. 25, 2012, now Pat. No. 9,028,199.

(51) Int. Cl.
*A01G 20/18* (2018.01)
*A01B 45/00* (2006.01)

(52) U.S. Cl.
CPC .............. *A01G 20/18* (2018.02); *A01B 45/00* (2013.01)

(58) Field of Classification Search
CPC ........ A01G 20/10; A01G 20/00; A01G 20/18; A01B 45/00

USPC ....... 37/231, 442; 111/100, 200, 901; 172/1, 172/19, 20, 29, 701.1, 709, 788, 793, 172/811, 812, 815, 817; 180/900; 280/776; 242/557, 615; 414/920, 24.5, 414/24.6, 25, 911, 787

See application file for complete search history.

(56) References Cited

U.S. PATENT DOCUMENTS 9,028,199 B2 * 5/2015 Carlson .................. A01G 20/10
414/787

OTHER PUBLICATIONS

Eatonville News Article, Jul. 19, 2009 (Year: 2009).*
Newsletter—Turfgrass Producers International (Year: 2008).*
Lawn at Luzhniki, YouTube, Https://www.youtube.com/watch?v-qX8HRViV8_M&feature=related, May 2, 2008 (Year: 2008).*

* cited by examiner

*Primary Examiner* — Christopher J. Novosad
(74) *Attorney, Agent, or Firm* — Erickson Law Group, PC

(57) ABSTRACT

An apparatus for a vehicle used for positioning sod strips includes a structure for mounting on the vehicle frame and a pushing plate slidably mounted to the structure. The pushing plate is arranged to be abuttable to an edge of a sod strip. A pair of cylinders are operatively mounted between the structure and the pushing plate to slide the pushing plate away from the structure to laterally shift a sod strip to tighten up seams between adjacent sod strips. The pushing plate slides in a lateral direction that is perpendicular to the straight ahead driving direction of the vehicle.

14 Claims, 11 Drawing Sheets

SOD POSITIONING MACHINE

This application is a continuation of U.S. Ser. No. 14/695,406, filed Apr. 24, 2015 which is a continuation-in-part of U.S. Ser. No. 13/358,143, filed Jan. 25, 2012.

BACKGROUND OF THE INVENTION

Various sod placement machines are known. U.S. Pat. Nos. 5,697,452; 4,777,890; 6,131,668 and 6,213,218 describe machines which are utilized to roll out sod from a roll to be oriented as a flat strip on the ground. While efforts are made to roll adjacent strips with minimal gaps or seams between adjacent strips, this is not always easily accomplished. Frequently, additional measures must be taken to laterally push a sod strip toward and against an adjacent strip to close a gap or seam between strips. This is sometimes done by manual labor or by using the traction force of a bucket loader or like vehicle.

The present inventor has recognized that using traction force from a vehicle to push sod strips can be undesirable because of the detrimental effect of the vehicle tires have on the un-sodded bare ground that supports the tires of the vehicle. The traction between tire and ground required for the vehicle to push the sod strip can cause ruts under the tires of the vehicle in the sand bed that awaits subsequently laid sod strips. This causes additional preparation work. Additionally, since the vehicle must be driven perpendicularly to the longitudinal strip direction, the vehicle must be constantly reoriented from strip to strip which also can cause ruts and unevenness in the sand or earth bed that awaits subsequently laid sod strips.

The present inventor has recognized that it would be desirable to provide a machine that accomplished the task of laterally positioning sod strips, already laid out flat on the ground, to tightly pack adjacent strips to minimize or eliminate gaps in the seams of adjacent sod strips.

SUMMARY OF THE INVENTION

The exemplary device of the invention provides an attachment or enhancement to a sod placement machine or other vehicle that comprises a pushing apparatus for pushing a sod strip that is already placed on the ground, tightly against an adjacent sod strip that is already placed on the ground. This action tightens up the seams between sod strips. The enhancement includes a stationary frame carried by the vehicle and a laterally sliding frame carried by the stationary frame. A pair of hydraulic or pneumatic cylinders are arranged to pivot the frames up or down between a deployed position and a stand-by or traveling position. The device includes a pair of hydraulic or pneumatic cylinders that are operable to slide the laterally sliding frame in a direction away from the stationary frame to push a sod strip, or toward the stationary frame to retract the laterally sliding frame closer to the vehicle for transport to a subsequent sod strip to be pushed. The laterally sliding frame includes a pair of sliding box beams that telescopically retract into box beams of the stationary frame. The sliding beams mount a pushing plate that abuts the sod strip during a pushing operation.

The sod positioning apparatus pushes the sod strips laid end-to-end to have a common straight line longitudinal edge. This increases the efficiency of the sod laying process. Also, by laterally pressing the sod strip using the apparatus of the invention, the sod strip is compressed and the density of sod increases. For example, a 42 inch wide sod strip can be compressed to 40 inches wide during positioning.

An alternate pushing plate comprises spikes extending from a bottom of the plate for use is pushing sod strips that are surrounded by sod or other obstacles that prevents exposing a side edge of the sod strip. The plate can be placed over the sod and penetration of the spikes into the sod strip creates a gripping that can be used to laterally shift the sod using the apparatus of the present invention.

A further enhancement of the invention includes a structure that overlies the sod strip and holds down the sod strip as it is being shifted and/or compressed by movement of the pushing plate. This prevents buckling up of the sod strip during sliding and/or compression.

Advantageously, the structure that overlies the sod strip comprises spaced-apart guide arms that extend from the pushing plate over the sod strip, either in contact with a top of the sod strip or closely adjacent thereto.

Numerous other advantages and features of the present invention will be become readily apparent from the following detailed description of the invention and the embodiments thereof, and from the accompanying drawings.

BRIEF DESCRIPTION OF THE DRAWINGS

FIG. 6A is a plan view of an alternate pushing assembly;

DETAILED DESCRIPTION

Figure 1:
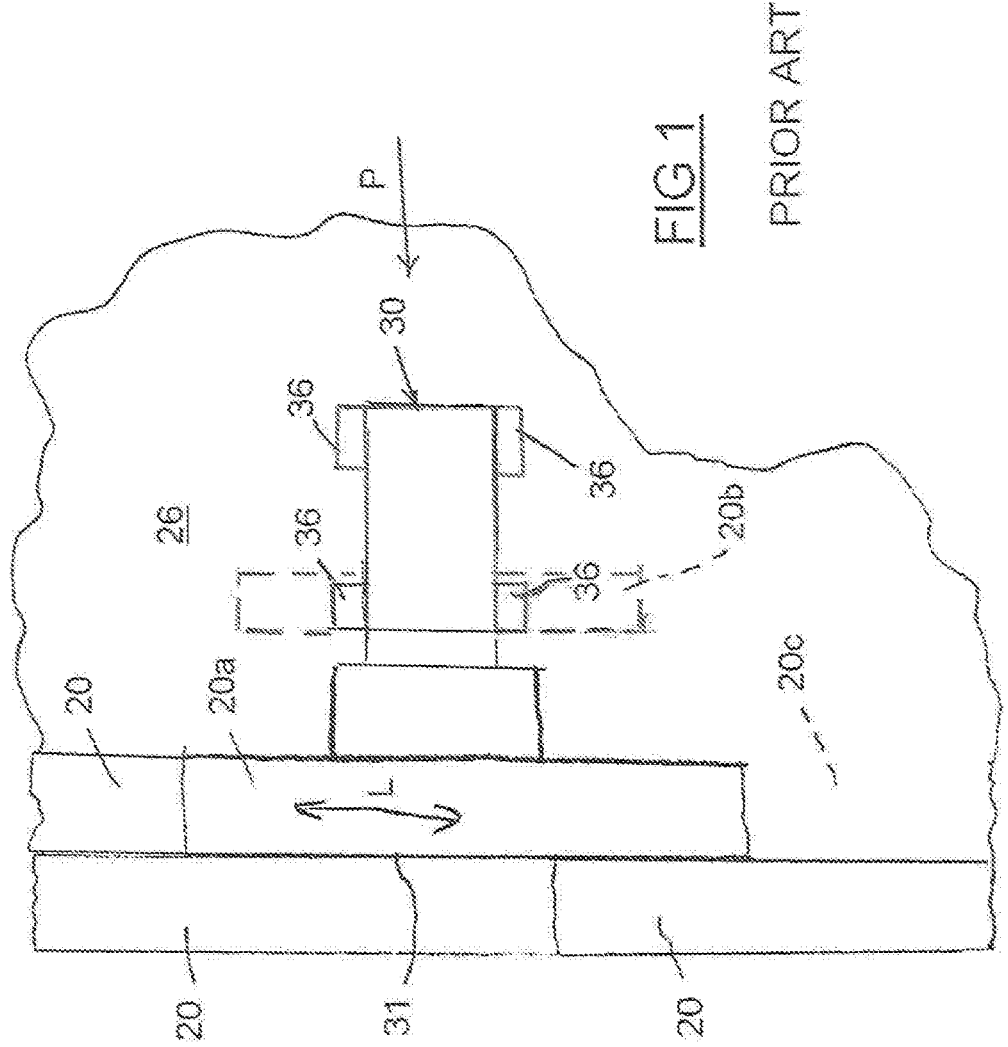
FIG. 1 is a schematic plan view of a prior art method of laterally shifting sod strips.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Ser. No. 13/358,143, filed Jan. 25, 2012 and U.S. Ser. No. 14/695,406, filed Apr. 24, 2015.

FIG. 1 illustrates a few strips 20 of sod that have been laid in a longitudinal direction L of the sod strips onto a bed 26 of sand or the like. A most recently laid strip 20a is shown being pushed in the lateral direction P by a vehicle 30, such as a "skid steer" loader or the like in order to tighten up the packing of the adjacent strips, i.e., to close or minimize the seam or gap 31. The vehicle 30 is driven by wheels and tires 36 that achieve forward traction force in the direction P by the interaction between the tires 36 and the bed 26. This interaction can cause ruts or other irregularities in the bed which must be smoothed before a subsequent strip 20b (shown dashed) is placed on the bed 26.

A future strip to be laid is shown dashed as 20c. In order for the vehicle 30 to be positioned against the strip 20c to push in the lateral direction P, in practical terms, the vehicle must turned, driven and reoriented. This also can cause ruts or other irregularities in the bed which must be smoothed before a subsequent strip 20b (shown dashed) is placed on the bed 26.

Figure 2:
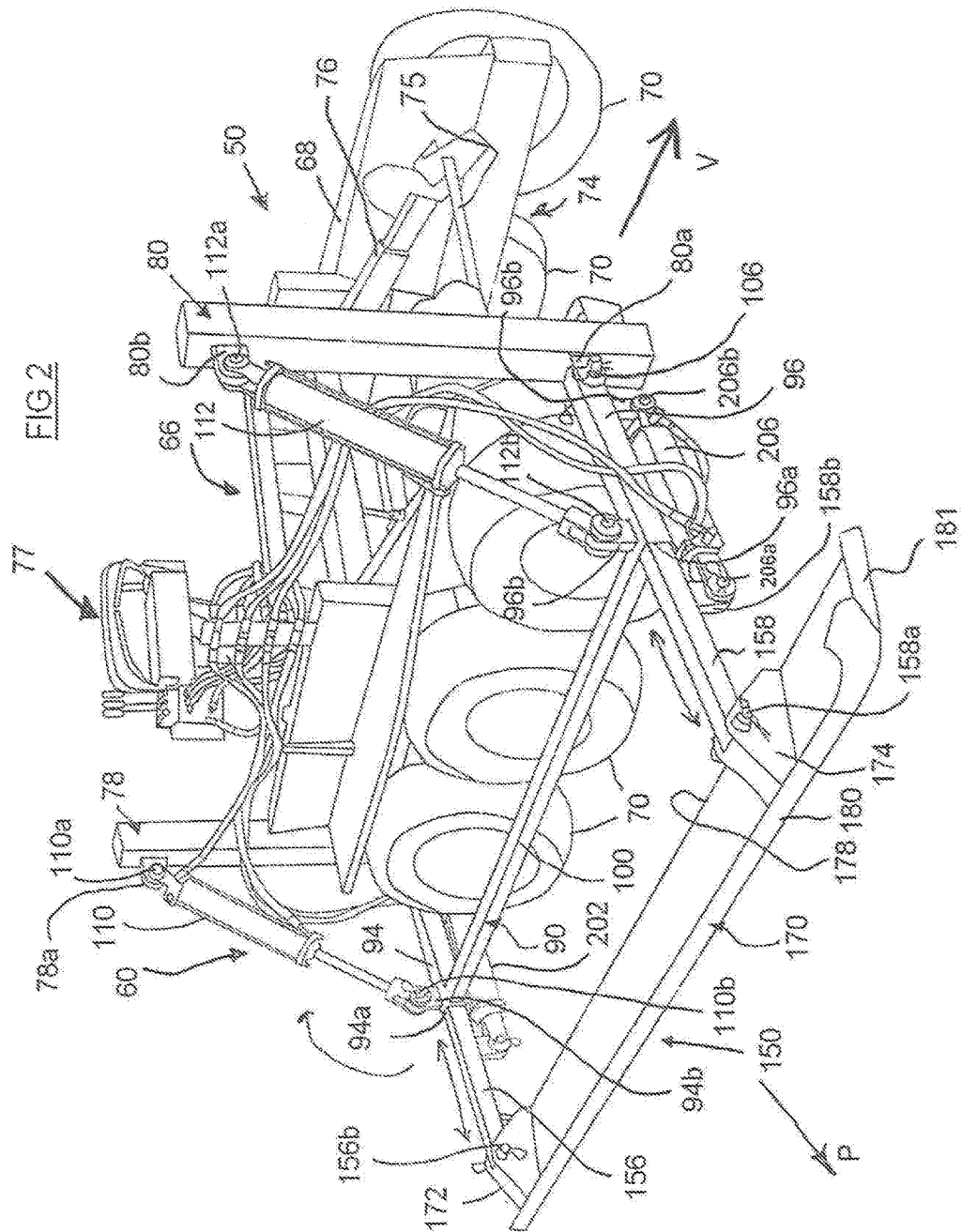
FIG. 2 is a perspective view of a sod positioning apparatus of the present invention.
Figure 3:
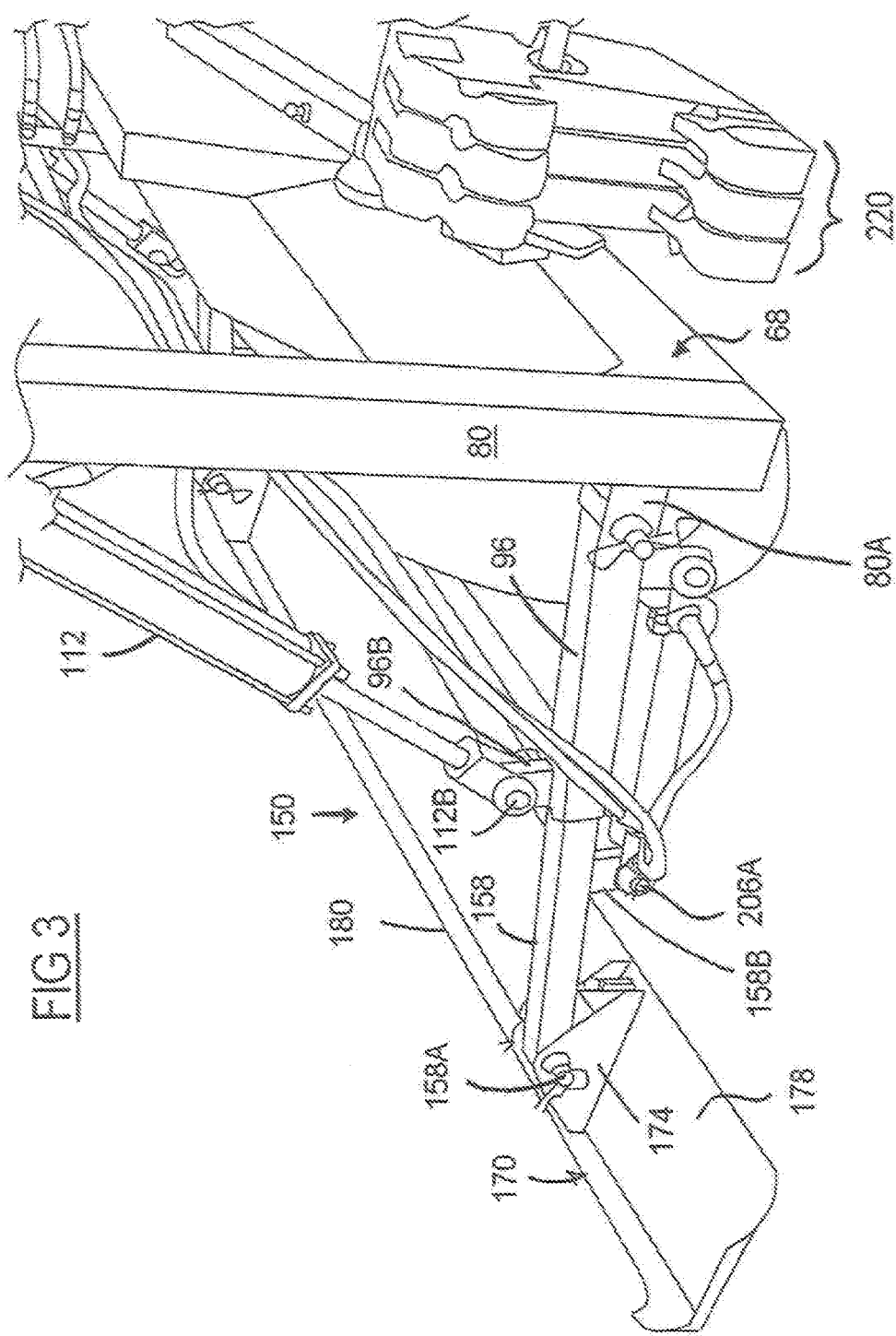
FIG. 3 is an enlarged perspective view of part of the apparatus shown in FIG. 2.
Figure 4:
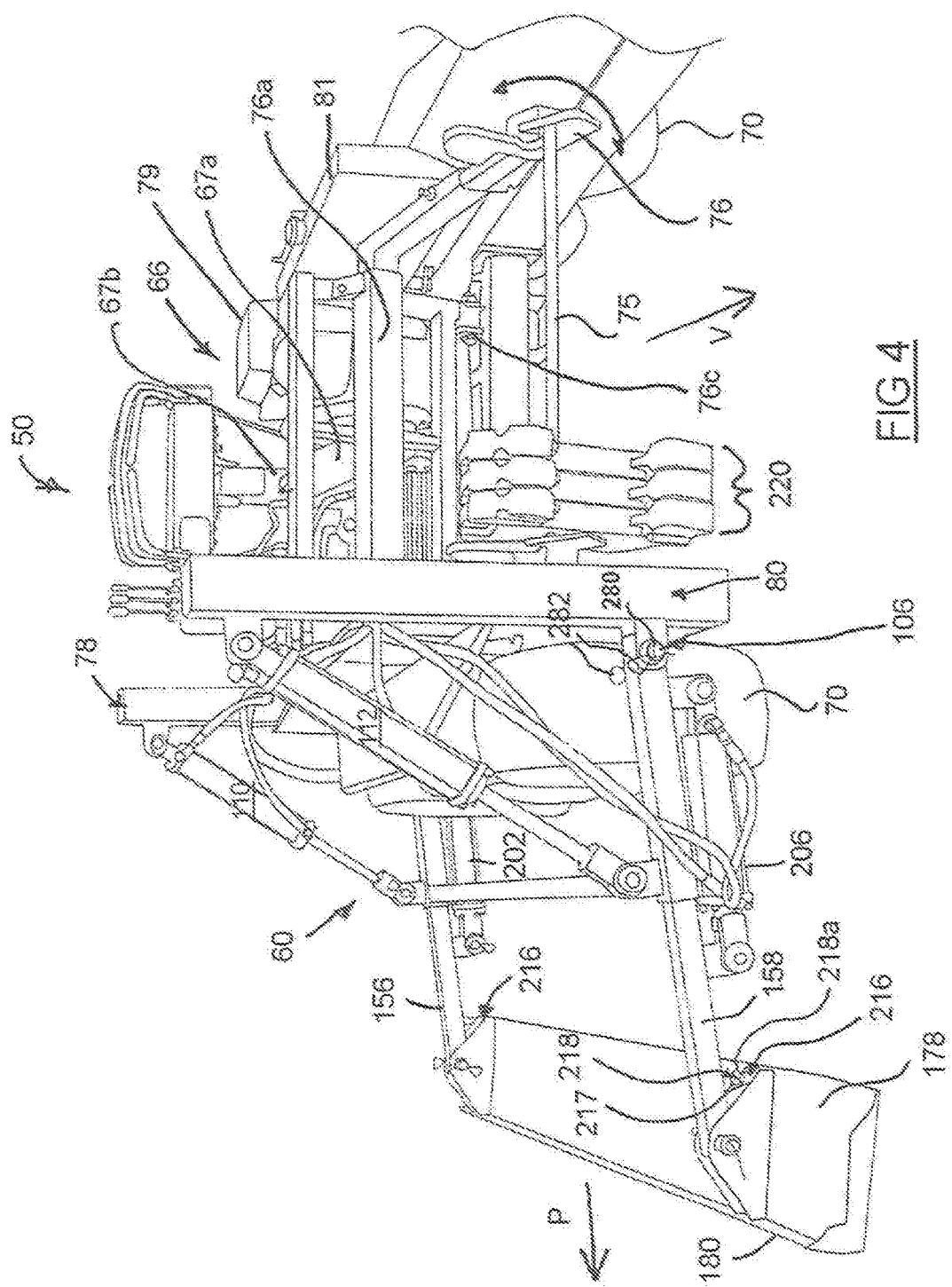
FIG. 4 is another perspective view of the apparatus shown in FIG. 2.

FIGS. 2-4 illustrate an apparatus 50 that overcomes the drawbacks of the prior method. The apparatus 50 includes an attachment or enhancement sod positioning apparatus 60 that is mounted on a vehicle 66. The vehicle 66 can be a sod placement vehicle such as described in U.S. Pat. No. 6,213,218, herein incorporated by reference. The vehicle 66 comprises a chassis frame 68 that is supported on six traction wheels and tires 70, at least one of which is driven by an engine and drivetrain (not shown). The vehicle can also provide a source (not shown) of controllable hydraulic or pneumatic pressurized working fluid to operate the apparatus 60, such as a compressor or pump and associated controls. The frame 68 includes a bay 74 in which a spindle 75 is mounted on a fork frame 76 that is used to hold and unroll sod rolls during placement of the sod strips onto the bed 26. The fork frame 76 is controlled to pivot up or down depending on the degree of depletion of sod on a sod roll. To this end a hydraulic cylinder 67a is connected between a stationary post 67b on the chassis frame 68 and a cross beam 76a of the frame 76. The frame is pivotal about an axis defined by two aligned pivot connections 76c (only one visible in FIG. 4). Thus retraction of the cylinder 67a will draw the cross member 76a back and pivot the frame 76 up at the end supporting the spindle 75, by pivoting the frame about the pivot connections 76c. Expansion of the cylinder will lower the spindle end of the frame 76. Sod installation machine frame can be expanded to accommodate sod rolls of different widths, such as 30 inches, 42 inches, 48 inches and 52 inches.

The vehicle can be driven by a plurality of hydraulic motors, such as one per each wheel, or other known traction drive. The vehicle can include a hydraulic oil system that drives the traction motors, controls steering, and raises and lowers the fork frame and spindle that holds a sod roll, all controlled at an operators station 77.

Also mounted on the chassis frame 68 is a hydraulic oil pump 79 and a fuel tank 81 (FIG. 4).

The apparatus 60 comprises two posts 78, 80 that are fixedly mounted to the frame 68 at a rear and front respectively of the near side of the vehicle, such as by fasteners or welding. A substantially U-shaped base frame 90 comprises rear and front base tubes 94, 96 respectively. The base tubes 94, 96 can have a square cross section and are hollow. A longitudinal brace tube 100 connects the rear and front tubes 78, 80. The rear and front base tubes 94, 96 have open ends 94a, 96a, respectively. The front tube 96 is connected at a low position to the post 80 by a pin connection 106 to a pair of lugs 80a to allow pivoting of the tube 96 with respect to the post 80. The rear tube 94 is connected at a low position to the post 78 by a pin connection (not visible in FIG. 2) to allow pivoting of the tube 94 with respect to the post 78, in an identical fashion as the front tube 96 is pivotally connected to the front post 80.

The frame 90 is supported from the posts 78, 80 by a pair of actuators, such as hydraulic or pneumatic cylinders, a rear cylinder 110 and a front cylinder 112. The rear cylinder is pivotally connected to an upper position on the post 78 by a pin connection 110a to a lug 78a. The cylinder 110 is also connected to a lug 94b on the tube 94 by a pin connection 110b. The front cylinder is pivotally connected to an upper position on the post 80 by a pin connection 112a to a lug 80b. The cylinder 112 is also connected to a lug 96b on the tube 96 by a pin connection 112b.

By hydraulic or pneumatic pressure control of the working fluid into select ports of the cylinders 110, 112, the cylinders can be made to work in unison to contract or elongate which will either pivot the frame 90 up or pivot the frame 90 down with respect to the posts 78, 80. In the case of using hydraulic cylinders, the flow of pressurized fluid to the cylinders is maintained uniform through pressure regulating valves, enhancing performance.

A pushing frame 150 is carried by the base frame 90. The pushing frame 150 comprises rear and front arm tubes 156, 158. The arm tubes 156, 158 are shaped and sized to slidably and telescopically fit into the open ends 94a, 96a of the base tubes 94, 96 and to slide into the base tubes 94, 96, respectively. A front of each of the arm tubes 156, 158 is connected to a pusher plate 170 via lugs 172, 174 by pin connections 156a and 158a. The plate 170 has a bottom wall 178 and an upturned front wall 180.

A rear hydraulic or pneumatic cylinder 202 is mounted between the arm tube 156 and the base tube 94. A front hydraulic or pneumatic cylinder 206 is mounted between the arm tube 158 and the base tube 96. Since the rear hydraulic tube is less visible in FIG. 2, the mounting of the front cylinder 206 will be described with the understanding that the rear cylinder 202 is mounted in identical fashion to the arm tube 156 and the base tube 94, as the front cylinder 206 is mounted to the arm tube 158 and the base tube 96.

One end of the cylinder 206 is connected by a pin connection 206a to the arm tube 158 via a lug 158b extending on a bottom side of the arm 158 and an opposite end of the cylinder 206 is connected by a pin connection 206b to the base tube 96 via a lug 96b extending on a bottom side of the base tube 96.

By hydraulic or pneumatic pressure control of the working fluid into select ports of the cylinders 202, 206, the cylinders can be made to work in unison to contract or elongate, which will either slide the tube arms 156, 158 in a direction out of the base tubes 94, 96 or retract the tube arms 156, 158 into the base tubes 94, 96. In the case of using hydraulic cylinders, the flow of pressurized fluid to the cylinders is maintained uniform through pressure regulating valves, enhancing performance.

Sliding the tube arms 156, 158 in a direction out of the base tubes 94, 96 pushed the frame 150 away from the vehicle to force the plate 170 to laterally push a sod strip in the direction P by forcing the upturned front wall 180 against a vertical lateral side of the sod strip 20. Retracting the cylinders 202, 206 will retract the frame away from sod strip and ready the frame for pushing against a subsequent strip. Thus, the movement of the pushing plate is in the lateral direction P that is perpendicular to a straight ahead driving direction V of the vehicle, i.e., the direction wherein the wheels are not turned but directed straight ahead. This allows the vehicle 66 to only travel in the straight ahead driving direction V parallel to the longitudinal direction L to move from strip to strip and still undertake lateral positioning adjustment of the sod strips to tighten up seams between adjacent strips in the direction P. A reorientation of the vehicle on the bed 26 to align a vehicle straight ahead driving direction in the direction P is avoided.

FIG. 4 also shows a stop assembly 216 comprising a threaded tube or threaded ferrule 217 welded to the bottom wall 178 and a bolt 218 adjustably threaded into the ferrule 217. The head 218a of the bolt 218 abuts the underside of the arm 158 if during positioning of the sod strip by hydraulic pressure from the cylinders 110, 112, 202, 206 the plate 170 tips up in the back. The adjustable degree of permissible tipping is selected by the vertical position of the head 218a that is selected by the degree of vertical threaded engagement of the bolt 218 into the ferrule 217. An identical stop assembly 216 can be arranged in similar fashion between the bottom wall 178 and the arm 156.

A plurality of "suitcase weights" or removable weights 220 are shown in FIGS. 3 and 4 installed onto the spindle 75. The weights 220 provide for an increased bracing force or reaction force via the tires of the vehicle during use of the cylinders 202, 206 to push against a sod strip to shift the sod strip laterally or compress the sod strip laterally. Alternative to using weights, a heavy sod roll can be carried on the spindle.

Although hydraulic or pneumatic cylinders 110, 112, 202, 206 are mentioned, it is within the scope of the invention that other actuators can be used, such as electrically driven actuators.

By retracting the cylinders 110, 112, 202, 206, the apparatus 60 can be folded up and the vehicle used for another purpose.

The upturned front wall 180 of the pusher plate 170 can be pushed against the sod edge for positioning. As applicable, a selectable removable strip or plate can be provided that is fastened or otherwise secured to the bottom wall 178 or to the upturned front wall 180 to accommodate pushing sod of varying thickness, such as 1 inches to 5 inches, that best matches the thickness of the sod being installed. The removable strip or plate can attach to the plate 170 and run the length of the plate 170. In some circumstances, the plate 170 works best when the bottom wall 178 lays flat against the bare ground for ease of operation and visibility for the operator, causing little or no disruption the existing grade or ground. Different plates 170 can be attached to the arms 156, 158 to accommodate different situations. For example, a 4 inch thick sod requires a wider upturned front wall 180, or an attached strip, as well as a wider bottom wall 178, wider in the direction P, providing a larger flat area to use the ground as leverage while pushing. Other plates can also be used.

Also, the plate 170 pivots at pin connections 156a and 158a which is effective for ground pressure control and allowing for angle positioning of the plate 170, depending on the terrain. Also a side edge upturned wall 181 is sloped or curved up, like a ski or sled to accommodate pushing or sliding along the ground when the machine moves in the direction V, with minimal disruption to the ground and reduces the need to lift the apparatus 60 for repositioning.

FIGS. 2-4 illustrates that the base tubes 94, 96 and arms 156, 158 are angled downwardly from the posts 78, 80 to the lugs 172, 174. The cylinders 202, 206 when extended, exert both a lateral force component and a downward force component to the pushing plate 170. The pushing plate thus also exerts a lateral and vertical downward force to the sod strip via the upturned front wall 180. The vertical downward force component helps to prevent folding or buckling of the sod strip during lateral compression by the pushing plate.

Also, the apparatus 60 can be folded up more completely by detaching the connections 110b and 112b and folding the frames 90, 150 up to the posts 78, 80 and securing thereto.

The connections 106, 156a, 158a and similar pivotal connections or joints can comprise a through pin 280 and two engageable hairpin-shaped retainer wires 282 which insert into end pin holes through the through pin, for quick disconnect of the connection, as shown for connection 106 in FIG. 4.

Figure 5:
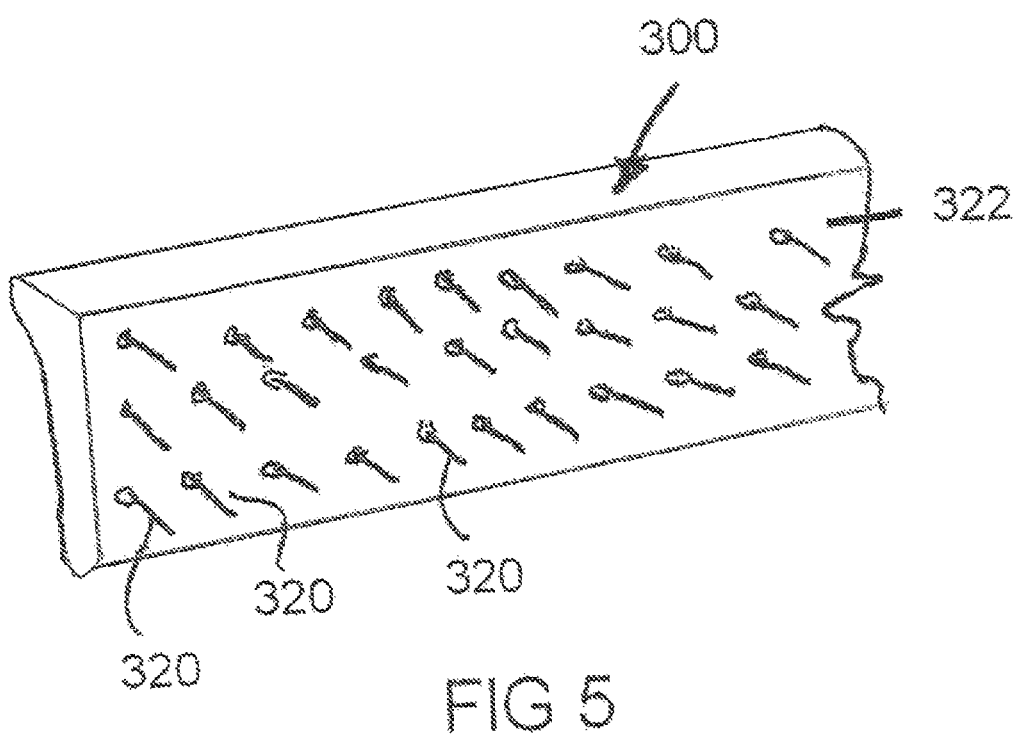
FIG. 5 is a bottom perspective view of an alternate plate used on the apparatus shown in FIG. 2.

Also, for example, as shown in FIG. 5, an alternate plate 300 that can replace the plate 170 shown in FIG. 2 can have spaced apart spikes 320 over its bottom surface, which extend downwardly in perpendicular fashion from a bottom wall 322. The spikes 320 can be 1.5 inch long spikes. The spikes 320 are useful for pushing sod in a repair area in the middle of a sod area, where there is no exposed vertical edge of the sod strip to push with a plate. Thus the gripping of the spikes 320 into a top of the sod strip gives the apparatus 60 a grip on the sod strip to exert a pushing force in the direction P with respect to the apparatus 60.

Figure 6:
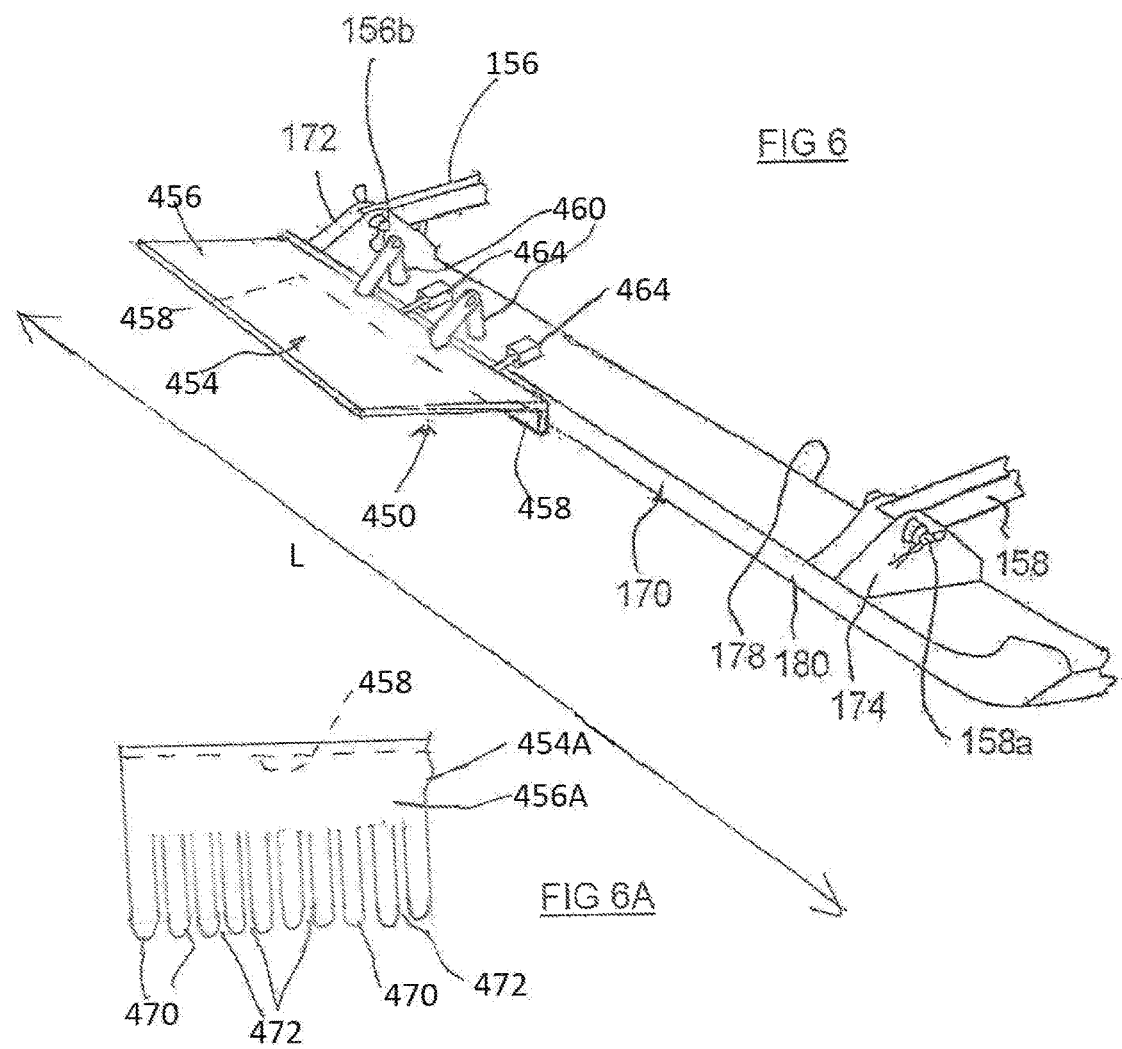
FIG. 6 is a perspective view of an alternate embodiment to that shown in FIG. 2 showing an alternate pushing plate assembly.

FIG. 6 shows an alternate embodiment which includes a sod strip hold down assembly 450 carried by the pushing plate 170. The pushing plate 170 is mounted on the arms 156, 158 of the frame 150 and operates as previously described in FIGS. 2-4 except as described below.

The assembly 450 is shown in FIG. 6 having a short length along the direction L compared to the length of the pushing plate 170. This depiction is only to more easily show the profile of the assembly in the drawing. It should be understood that the assembly would advantageously have a length substantially equal to the length of the pushing plate 170.

The assembly 450 includes a prone, L-shaped sod plate 454 having a horizontal plate member 456 and a vertical plate member 458. A plurality of spaced-apart hinge assemblies 460 connect the sod plate 454 to the pushing plate 170. A plurality of spring assemblies 464 act between the sod plate 454 and the pushing plate 170. Although only two hinge assemblies 460 and two spring assemblies 464 are shown in FIG. 6, the hinge assemblies 460 and the spring assemblies 464 can be more numerous and are spaced apart along the entire length of the pushing plate 170 and the sod plate 454.

FIG. 6A illustrates an alternate sod plate 454A having the same vertical plate member 458 but an alternate horizontal plate member 456A. The alternate horizontal plate member 456A is configured in comb-like fashion, having tines or guide arms 470 between gaps 472. The gaps 472 allow an operator to have a clear view of the sod strip 20 as the plate 454A is setting up over the sod strip 20 and while the plate 454A is applied down onto the sod strip 20 during pushing of the sod strip 20. Other shapes of the plates 454, 454A are encompassed by the invention including plates with viewing holes. The plates 454, 454A can also have upwardly curved end or ends 455 as shown in FIGS. 7-11, to avoid digging into sod strips.

Figure 7:
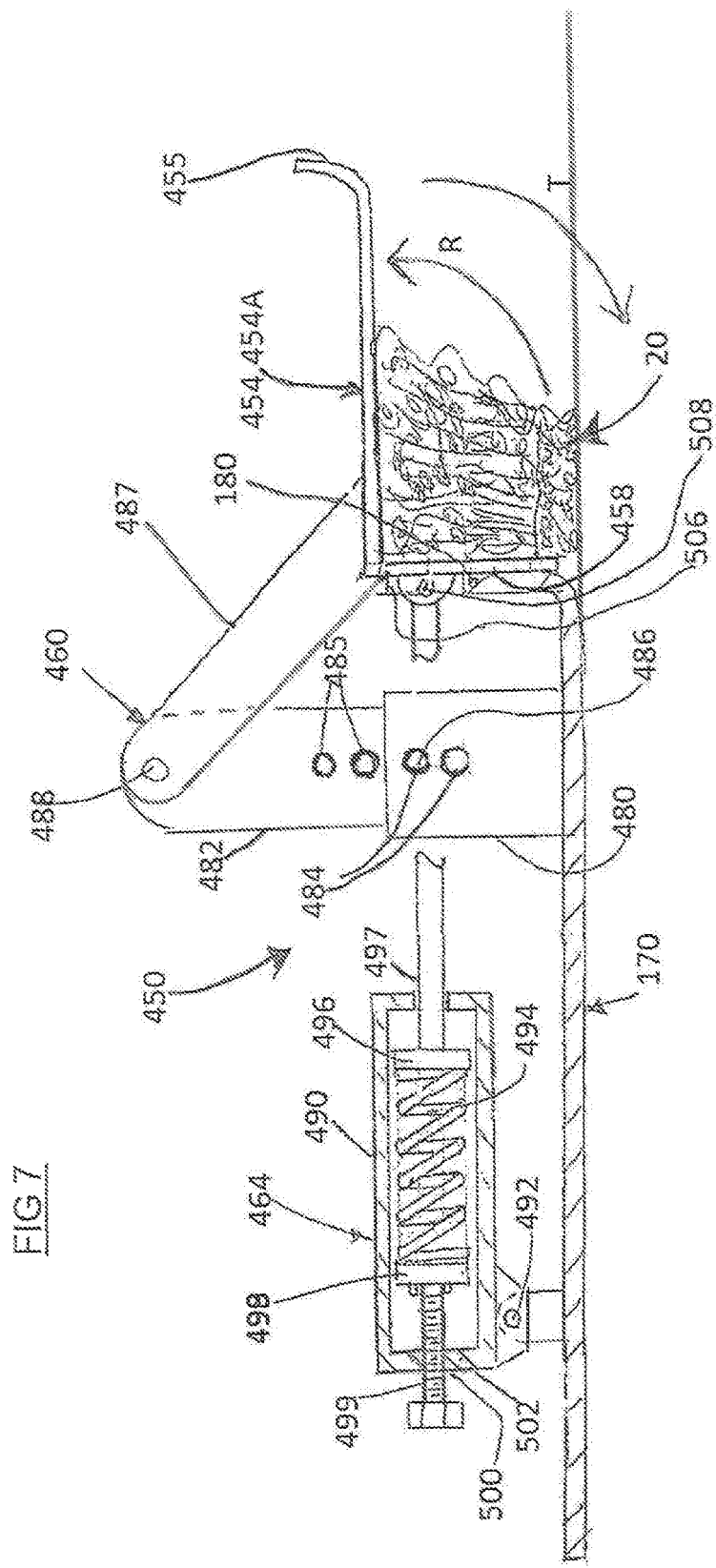
FIG. 7 is a sectional view taken generally along line 7-7 of FIG. 6.

FIG. 7 illustrates one embodiment of the hold down assembly 450. The hinge assembly 460 includes a base 480 in the form of a tube or socket that is welded or otherwise fixed to the pushing plate 170. A separate extender 482 telescopes into the base 480 and its depth is made adjustable by holes 484 in the base and holes 485 in the extender that can be selected for a pair of holes 484, 485 to register and a pin 486 can be inserted into registering holes 484, 485. By selecting which hole pair of the base and the extender to register and receive the pin, the extension of the extender 482 above the base 480 can be selected. A bar 487 is pivotally connected to a top of the extender 482 via a pin or bolt 488. The bar is welded or otherwise fixed to the plate 454 (or 454A). Thus the plate 454 (or 454A) can orbit or pivot around the connection 488 as the bar 487 rotates about the connection 488.

The spring assembly 464 includes a spring cylinder 490 that is pivotally connected to the plate 170 by a pivot connection 492. A spring 494 is inside the cylinder 490. In the illustrated embodiment the spring is a compression coil spring. On the right side of the spring in FIG. 7, the spring pushes against a flange 496 connected to a push rod 497. On a left side of the spring in FIG. 7, the spring pushes on a backing flange 498 pressed by a threaded adjuster 499, which can rotate about its axis with respect to the flange 498. The adjuster is threaded into a threaded hole 500 in the back wall 502 of the cylinder 490. Turning of the threaded adjuster changes the longitudinal position of the flange 498 within the cylinder 490 and thus changes the pre-load or pre-compression of the spring.

The push rod 497 passes through an opening 506 in the upstanding wall 180 of the plate 170. The push rod 497 is connected at an opposite end from the flange 496, to the vertical member 458 of the sod plate 454, 454A, at a pivotal connection 508. Thus, the spring 494 urges the sod plate 454, 454A to pivot or orbit around the connection 488 in the rotary direction R. When the vertical member 458 pushes against a sod strip 20, the reaction force from the sod strip 20 urges the plate to orbit in the opposite direction T against the urging of the spring 494. Thus the plate is elevated when approaching the sod strip 20 but once engaged and pushing the sod strip 20, the plate 454, 454A pivots down so that the horizontal member 456, 456A either closely overlies or presses down on the top of the sod strip 20 to prevent buckling of the sod strip 20 during pushing and horizontal compression of the sod strip 20.

Figure 8:
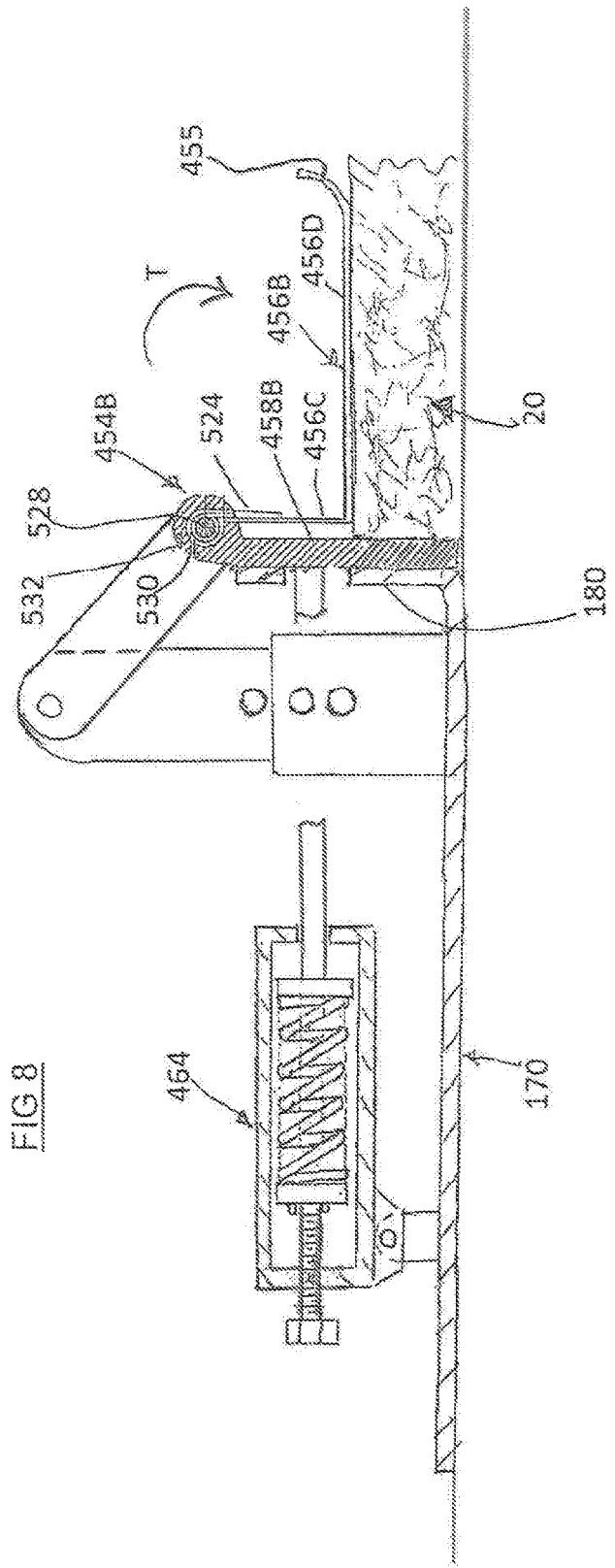
FIG. 8 is a sectional view taken generally along line 7-7 of FIG. 6 showing an alternate embodiment.

FIG. 8 illustrates an alternate embodiment sod plate assembly 454B that includes a vertical member 458B and an alternate hold down plate 456B. The hold down plate 456B is L-shaped and has a vertical leg 456C and a horizontal leg 456D. The vertical leg 456C is spring loaded by a torsion spring 524 in the rotary direction T to resiliently press the horizontal leg 456D of the hold down plate 456B down onto the sod strip 20. The torsion spring 524 is wound around an axle 528 and has a base end portion 530 that is selectively engaged with one of a number of detents 532 in order to adjust the spring force of the torsion spring 524 onto the plate 456B. The axle 528 and detents 532 are carried by the vertical member 458B. The plate 456D can be configured like either the plate 454 or the plate 454A including upturned end or ends 455.

Figure 9:
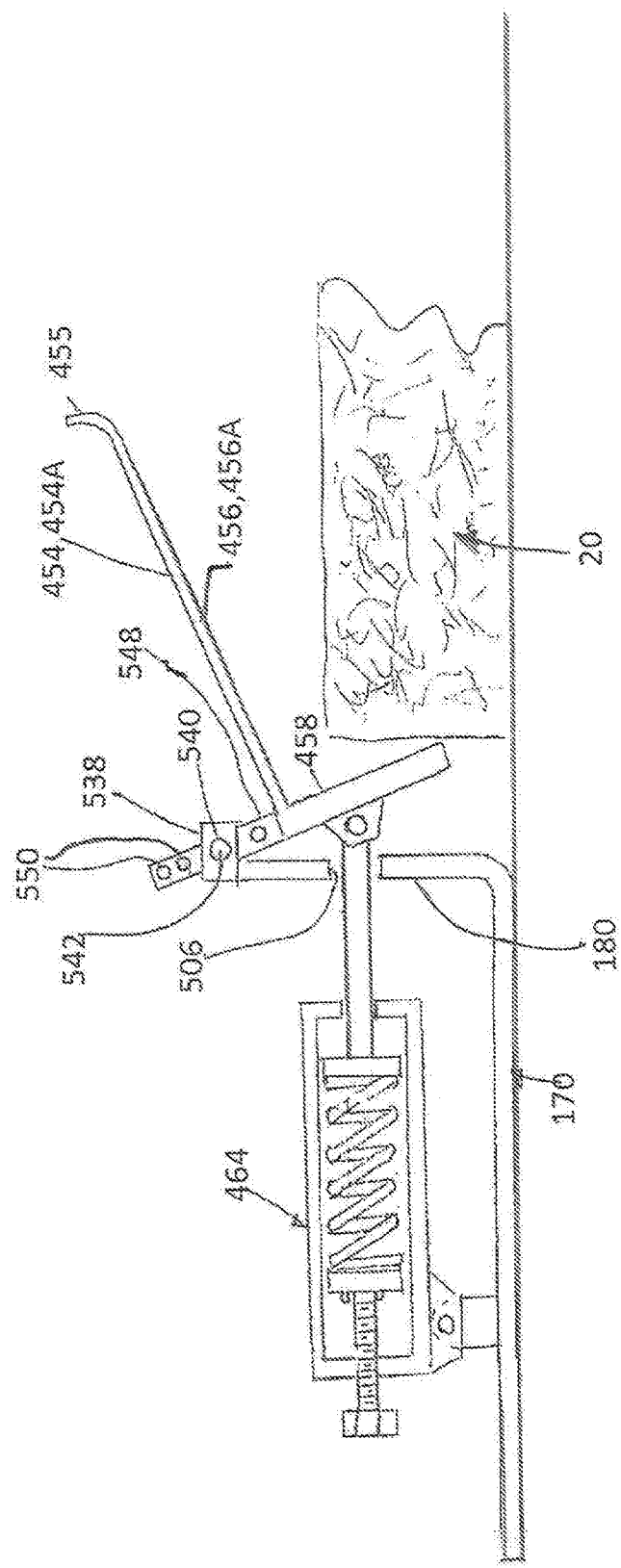
FIG. 9 is a sectional view taken generally along line 7-7 of FIG. 6 showing an alternate embodiment.

FIG. 9 illustrates an alternate embodiment similar to the embodiment shown in FIG. 7 except including an alternate hinge assembly wherein the end wall 180 of the pushing plate 170 has a lug 538 having a hole 540 for receiving a pivotal connector 542, such as a pin or bolt. The plate 454 (or 454A) has an extender lug 548 with spaced-apart holes 550 that can register with the hole 540 to receive the connector 542 to adjust the height of the plate 454 (or 454A) with respect to the plate 170. The plate 170 is shown in FIG. 9 approaching the sod strip 20, before pressure from the sod strip 20 against the vertical plate member 458, during the continued approach of the plate 170 against the sod strip, forces the vertical plate member to pivot about the connector 542 to abut the plate 180.

Figure 10:
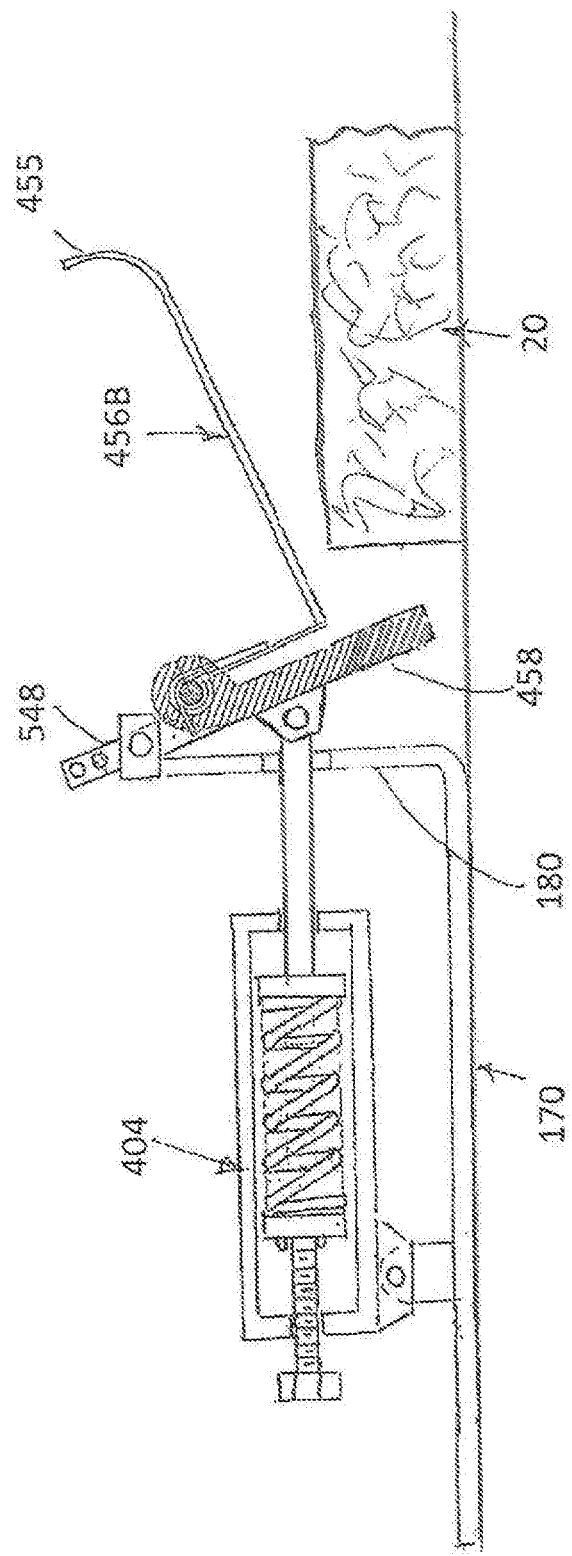
FIG. 10 is a sectional view taken generally along line 7-7 of FIG. 6 showing an alternate embodiment.

FIG. 10 illustrates an alternate embodiment hinge assembly from that shown in FIG. 9 except with the alternate hold down plate of FIG. 8.

Figure 11:
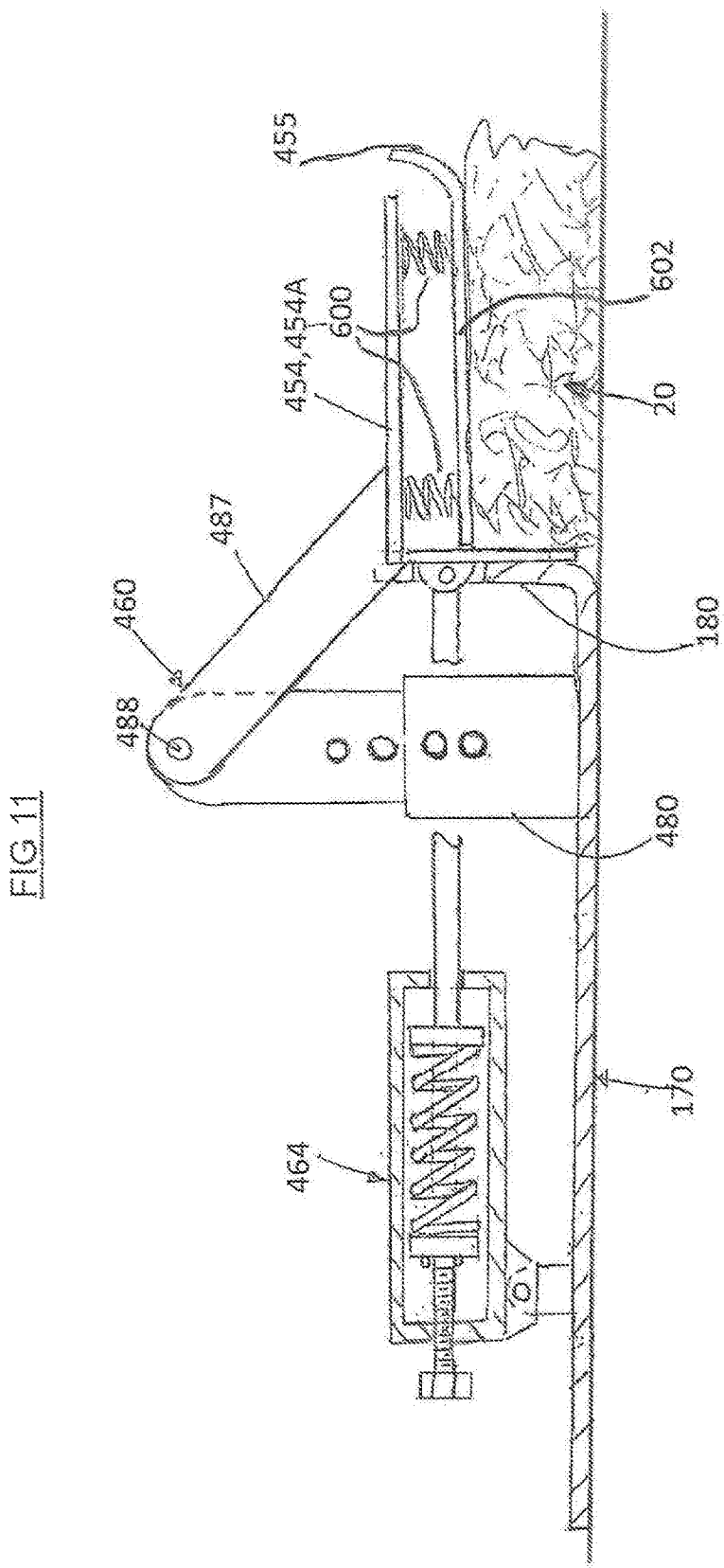
FIG. 11 is a sectional view taken generally along line 7-7 of FIG. 6 showing an alternate embodiment.

FIG. 11 illustrates an alternate embodiment to that shown in FIG. 7 except with a different hold down plate. In this embodiment coil springs 600 are arranged between the horizontal plate member 456 (or 456A) and a sub plate 602 that resiliently presses down on the sod strip 20 by force from the springs 600. The sub plate 602 can be configured like either the plate 454 or the plate 454A including upturned end or ends 455.

FIGS. 6-11 describe embodiments wherein the plates 454, 454A are spring loaded by the spring assemblies 464 to pivot away from the plate 170 to be tilted up when the plate 170 is approaching the sod strip 20 and which, by force and contact pressure from the edge of the sod strip during the continued approach, cause the plate 454 or 454A to pivot down over the top of the sod strip to press or restrain the top surface of the sod strip down.

FIGS. 8, 10 and 11 add a further enhancement wherein the hold down arrangement presses a plate over a top of the sod strip with a resilient, spring loaded force. The spring force from the spring assemblies 464 and the spring force from the torsion springs 524 or coil springs 600 are balanced such that the sod pushes the plate 458 or 458B against the plate 180 while the plate 456D or 602 exerts a resilient contact force on a top of the sod strip as shown in FIG. 8.

From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein, to the extent that the references are not inconsistent with the present disclosure.

The invention claimed is:

1. An apparatus for positioning sod strips, comprising:
a mounting structure for mounting on a vehicle;
a pushing plate assembly slidably mounted to the structure, the pushing plate assembly having a vertical pushing surface arranged to be abuttable to a vertical edge of a newly placed sod strip that has already been placed flat on the ground; and
at least one actuator operatively mounted between the mounting structure and the pushing plate assembly to slide the pushing plate assembly away from the mounting structure to position and laterally compress the newly placed sod strip, the at least one actuator arranged to exert a force on the pushing plate assembly that has both horizontal and downward components.

2. The apparatus according to claim 1, comprising a pushing frame that carries the pushing plate assembly, the pushing frame having arms between the pushing plate and the mounting structure, the arms oriented at a downward angle to the pushing plate; and
the mounting structure comprises a base frame, the base frame having base tubes extending from the vehicle toward the pushing plate, each arm slidably received into a respective base tube, and the at least one actuator comprises a pair of actuators, one mounted between each arm and each respective base tube.

3. The apparatus according to claim 2, wherein said mounting structure comprises a pair of upstanding posts that are configured to be mounted to the vehicle, the base frame being supported by the pair of posts.

4. The apparatus according to claim 3, wherein the base frame is pivotally connected to the posts, and comprising at least one pivot actuator that is configured to controllably pivot up or down the base frame.

5. The apparatus according to claim 4, wherein the at least one pivot actuator comprises a pair of pivot actuators operably connected between the pair of posts and the base tubes of the base frame.

6. The apparatus according to claim 1, further comprising a vehicle for moving along the ground, said structure mounted to the vehicle.

7. The apparatus according to claim 6, wherein the vehicle comprises a sod roll holding and dispensing device to hold and dispense a roll of sod for unrolling and placement of the roll of sod flat on the ground.

8. The apparatus according to claim 7, wherein the sod roll holding and dispensing device comprises a spindle carried by a forked frame.

9. An apparatus for positioning sod strips, comprising:
a mounting structure for mounting on a vehicle;
a pushing plate assembly slidably mounted to the structure, the pushing plate assembly having a vertical pushing surface arranged to be abuttable to a vertical edge of a newly placed sod strip that has already been placed flat on the ground, and a horizontal surface arranged to be pressed to the ground on a side of the vertical pushing surface opposite the vertical edge of a newly placed sod strip;
at least one actuator operatively mounted between the mounting structure and the pushing plate assembly to slide the pushing plate assembly away from the mounting structure to position and laterally compress the newly placed sod strip;
wherein the at least one actuator exerts a force on the pushing plate that has a force direction having a lateral component and a vertical downward component.

10. The apparatus according to claim 9, comprising a pushing frame that carries the pushing plate, the pushing frame having arms between the pushing plate and the mounting structure; and
the mounting structure comprises a base frame, the base frame having base tubes extending from the vehicle toward the pushing plate, each arm slidably received into a respective base tube, and the at least one actuator comprises a pair of actuators, one mounted between each arm and each respective base tube.

11. The apparatus according to claim 9, further comprising a vehicle for moving along the ground, said structure mounted to the vehicle.

12. The apparatus according to claim 11, wherein said structure comprises a pair of upstanding posts that are configured to be mounted to the vehicle, and a base frame, the base frame guiding sliding movement of the pushing plate, the base frame being supported by the pair of posts.

13. The apparatus according to claim 12, wherein the base frame is pivotally connected to the posts, and comprising at least one pivot actuator that is configured to controllably pivot up or down the base frame.

14. The apparatus according to claim 13, wherein the at least one pivot actuator comprises a pair of pivot actuators operably connected between the pair of posts and the base frame.

* * * * *